United States Patent [19]

Bernstein

[11] Patent Number: 5,355,405
[45] Date of Patent: Oct. 11, 1994

[54] ARRANGEMENT FOR DYNAMICALLY IDENTIFYING THE ASSIGNMENT OF A SUBSCRIBER TELEPHONE LOOP CONNECTION AT A SERVING TERMINAL

[75] Inventor: Lawrence Bernstein, Short Hills, N.J.

[73] Assignee: AT&T Bell Laboratories, Murray Hill, N.J.

[21] Appl. No.: 904,788

[22] Filed: Jun. 26, 1992

[51] Int. Cl.⁵ .............................................. H04M 3/30
[52] U.S. Cl. ..................... 379/246; 379/245; 379/25; 379/6
[58] Field of Search ..................... 379/6, 25, 27, 245, 379/246, 247

[56] References Cited

U.S. PATENT DOCUMENTS

| | | | |
|---|---|---|---|
| 4,479,196 | 10/1984 | Ferrer et al. | 364/900 |
| 4,670,898 | 6/1987 | Pierce et al. | 379/29 |
| 4,764,949 | 8/1988 | Faith et al. | 379/27 |
| 4,937,851 | 6/1990 | Lynch et al. | 379/6 |
| 4,959,856 | 9/1990 | Bischoff et al. | 379/245 |

Primary Examiner—James L. Dwyer
Assistant Examiner—Daniel S. Hunter
Attorney, Agent, or Firm—Frederick B. Luludis

[57] ABSTRACT

A method of arranging outside plant facilities associated with a telephone office is disclosed, in which serving terminals that connect to respective telephone station sets are designated as the originating equipment rather than the telephone office, thereby greatly simplifying the inventory of such facilities. As a result of such simplification, the outside loop assignment of a drop wire is then determined dynamically at the serving terminal.

2 Claims, 3 Drawing Sheets

ARRANGEMENT FOR DYNAMICALLY IDENTIFYING THE ASSIGNMENT OF A SUBSCRIBER TELEPHONE LOOP CONNECTION AT A SERVING TERMINAL

TECHNICAL FIELD

The invention relates to telephone outside plant facilities, and particularly relates to the assignment of a subscriber telephone loop to such facilities.

BACKGROUND OF THE INVENTION

A telephone system includes what is commonly referred to as "outside plant". The outside plant comprises the physical facilities (wires, cables, cross-connect boxes) that interconnect telephone station sets with a central office switch. FIG. 1, more particularly, shows a schematic diagram of typical outside plant facilities that are used to connect telephone subscribers to a local Central Office (CO) 100. Such outside plant facilities include multiconductor cables, e.g., cables 41 through 45, each of which includes a large number of pairs of copper wires twisted together. In general, one such pair is used to provide telephone service to one subscriber. Cables are identified as to their proximity to CO 100, e.g., F1 cables 41 and 42 and F2 cables 43, 44 and 45, separated by cross-connect terminals 46 and 47. F1 cables 41 and 42 are often called feeder cables, since they connect to terminals located at one side of a Main Distributing Frame (MDF) contained in CO. The terminals at the other side of the MI)F connect to respective port, or line, circuits, of Originating Equipment (OE) associated with switching equipment that is also located in the CO. It is the port circuit that presents dial tone to an associated telephone station set which is in an off-hook state and which is connected to the port circuit via the outside plant facilities.

Cross-connect terminals 46 and 47, in particular, are devices for connecting wire pairs to each other. They have one set of binding posts for connecting wire pairs from the central office (the IN side set) and another set of binding posts for connecting wire pairs from the opposite (field) direction (the OUT side set). In addition, wire jumpers are used to connect selected IN pairs to selected OUT pairs, thereby effectuating a physical connection between distribution cable pairs and feeder cable pairs.

At selected points along cables 41 through 45 are serving terminals 48. These serving terminals also have binding posts for connecting cable pairs to customer service wires such as drop wires 49 and 50 connected to customer living units 51 and 53, respectively. Distribution, or serving, terminals are typically located at concentrations of subscriber living units and can be located on telephone poles, in pedestals or on customers' premises.

While connections at cross-connect and serving terminals are maintained for a relatively long period of time, customers do move, thereby causing outside facilities to be reassigned. In central offices serving hundreds of thousands of customers, such reassignments of outside facilities constitutes a major, labor-intensive activity. Maximizing the efficiency and minimizing the cost of such reassignments has, therefore, become an important telephone company activity. For example, the telephone company employs very large databases to inventory the status of each element (i.e., cables, pairs, cross connect and serving terminals, etc) forming its outside plant facilities so that it may readily identify which elements are idle, in use (working), spare, defective, etc. The telephone company also employs other large databases to track and assign the unique connections from the central office main distributing frame to respective living units, e.g., LUs 51 through 53.

For example, TN:OE:F1 ... FN:ST:Home Address: Billing Address:Listing Address: is the format of the fields of a database record, the contents of which define a unique connection, where TN is the assigned Telephone Number; OE is the address of the Originating Equipment (i.e., telephone switch input port or line circuit); FI ... FN identify the cables pairs involved in the connection as well as the cross connect terminals and associated binding posts at which the cable pairs are connected; and ST identifies the serving terminal and associated binding post for the connection of the drop wire to the living unit (the remaining fields are self explanatory). Thus, the connection starts at the OE, the source of dial tone, and ends at a particular binding post of the serving terminal. (It is often the case that a number of levels of outside cables, (F1, F2 . . . Fn) are needed to implement telephone service to a telephone station set.)

Providing telephone service to a subscriber's living unit thus entails assigning in a database the necessary wires, terminals, binding posts and subscriber service wires to create a complete and continuous transmission circuit (local loop) between the local CO and subscriber's telephone station set. Once the assignment is made in the database, then the corresponding physical connections have to be made in the field at the time that service is to be initiated.

It can be appreciated from the foregoing that the amount of data that is stored in such databases is enormous and that the cost of provisioning and maintaining such databases is indeed very expensive.

Steps have been taken, however, to simplify such outside plant facilities. Specifically, the telephone companies have been installing electronic signal distributors operative for multiplexing an appreciable number of circuits over a few wires, e.g., two pairs of wires, thereby eliminating the need to employ cables containing large numbers of wire pairs. In this way a cable, for example, cable 41, may be replaced by four wires (two pairs) to interconnect a number of OEs at the CO and a Subscriber Loop Carrier (SLC) system located at a cross connect terminal, e.g., CCT 46. Such a SLC may be, for example, the model SLC2000 available from AT&T. Briefly, one pair of the four wires to the SLC may be used to transport circuit information from the CO to the input of the SLC, in which the information is contained in a respective one of a plurality of time-based channels (i.e. time slots). The SLC, in turn, demultiplexes the channels (or time slots) and delivers the information contained therein to respective ones of its associated terminals (binding posts). Such terminals include a terminal connected to a pair of wires extending to a living unit. The SLC also multiplexes information inputted at its associated terminals onto various time-based channels transmitted over the pair of wires for delivery to respective OEs at the associated CO.

In addition, a SLC may be disposed at each serving terminal and each intermediate cross connect terminal to greatly reduce the number of such large cables. However, such a reduction in the number of large cables does not lead to like reduction in the amount of data that is stored in the aforementioned databases. The reason for this is that an assignment still includes all of the elements involved in establishing a connection from an OE to a serving terminal binding post even though the end-to-end connection is derived from time-based apparatus, i.e. time slots.

SUMMARY OF THE INVENTION

I have recognized that the bar to appreciably reducing the level of inventory data contained in such databases is the notion that the source of a loop circuit is an OE. I have further recognized, in accord with an aspect of the invention, that inventory data relating to outside plant employing SLC systems can be greatly reduced by considering the serving terminal to be the source of a loop circuit, thereby eliminating the need to store F1 though FN field data in an associated assignment record. Advantageously, then, such a record may contain just the 0E assignment, the identity of the serving terminal and assigned channel number, and associated billing data. Moreover, I have further recognized that, in accord with an aspect of the invention, a CO may be easily adapted so that it identifies for a craftsperson positioned at a serving terminal the binding post that is presented to the assigned channel. Specifically, a craftsperson may readily identify such a binding post by placing, via a maintenance channel, a telephone call to a predefined telephone number and, in response to the call being answered at the CO, entering the telephone number associated with the new service. The CO, in response to receipt of the latter telephone number, terminates the call and, in accord with an aspect of the invention, transmits particular signals over the path that includes the assigned channel so that such signals may be presented to the pertinent serving terminal binding post. Accordingly, the craftsperson may readily identify that binding post by checking each idle (unused) binding post for receipt of the particular signals. In accord with an aspect of the invention, such particular signals may be computer generated speech signals announcing the digits of the received telephone number.

DETAILED DESCRIPTION

Figure 1:
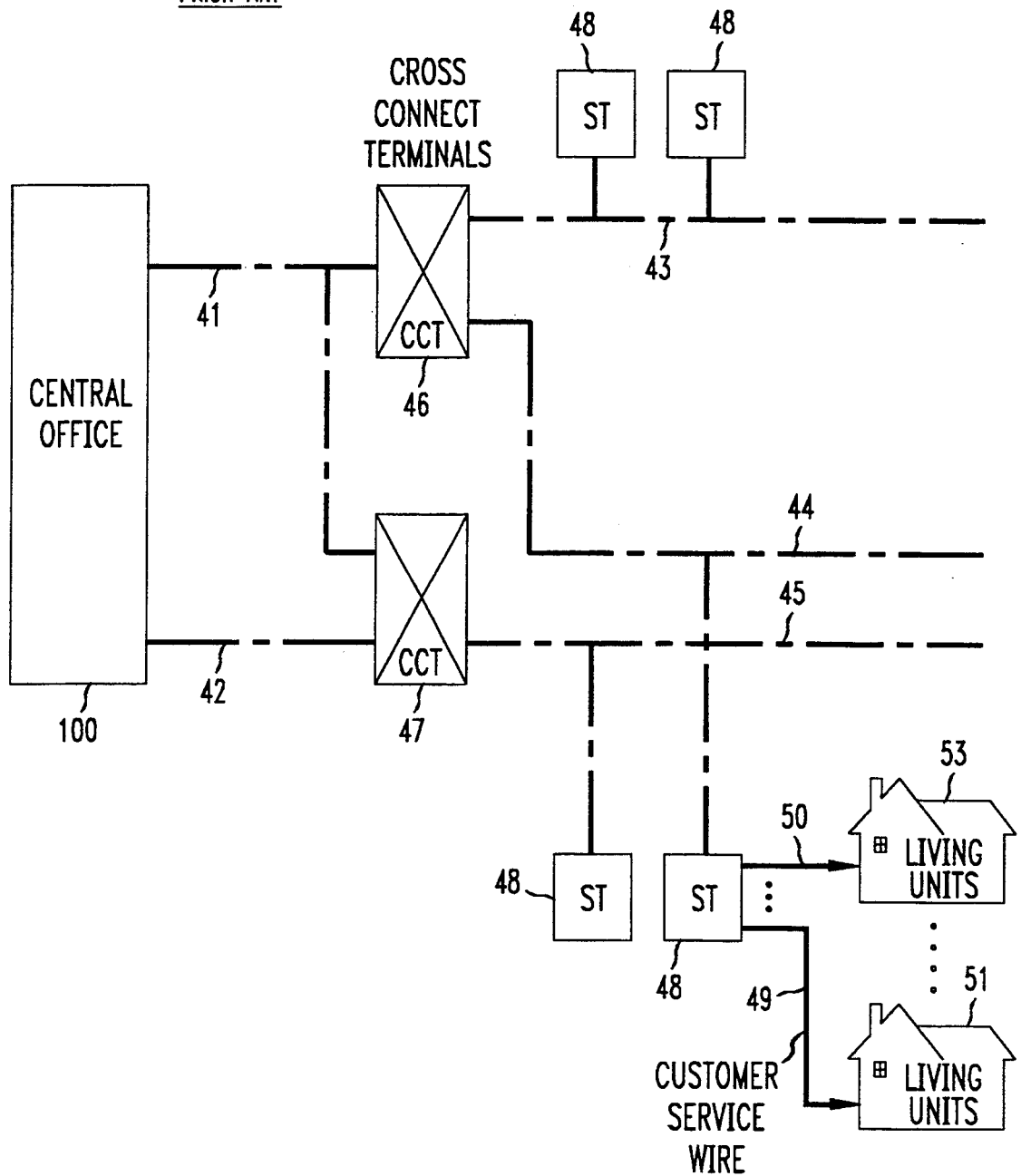
FIG. 1 is a prior art, illustrative example of outside plant facilities associated with a telephone company central office and is useful for discussing the background of the invention.
Figure 2:
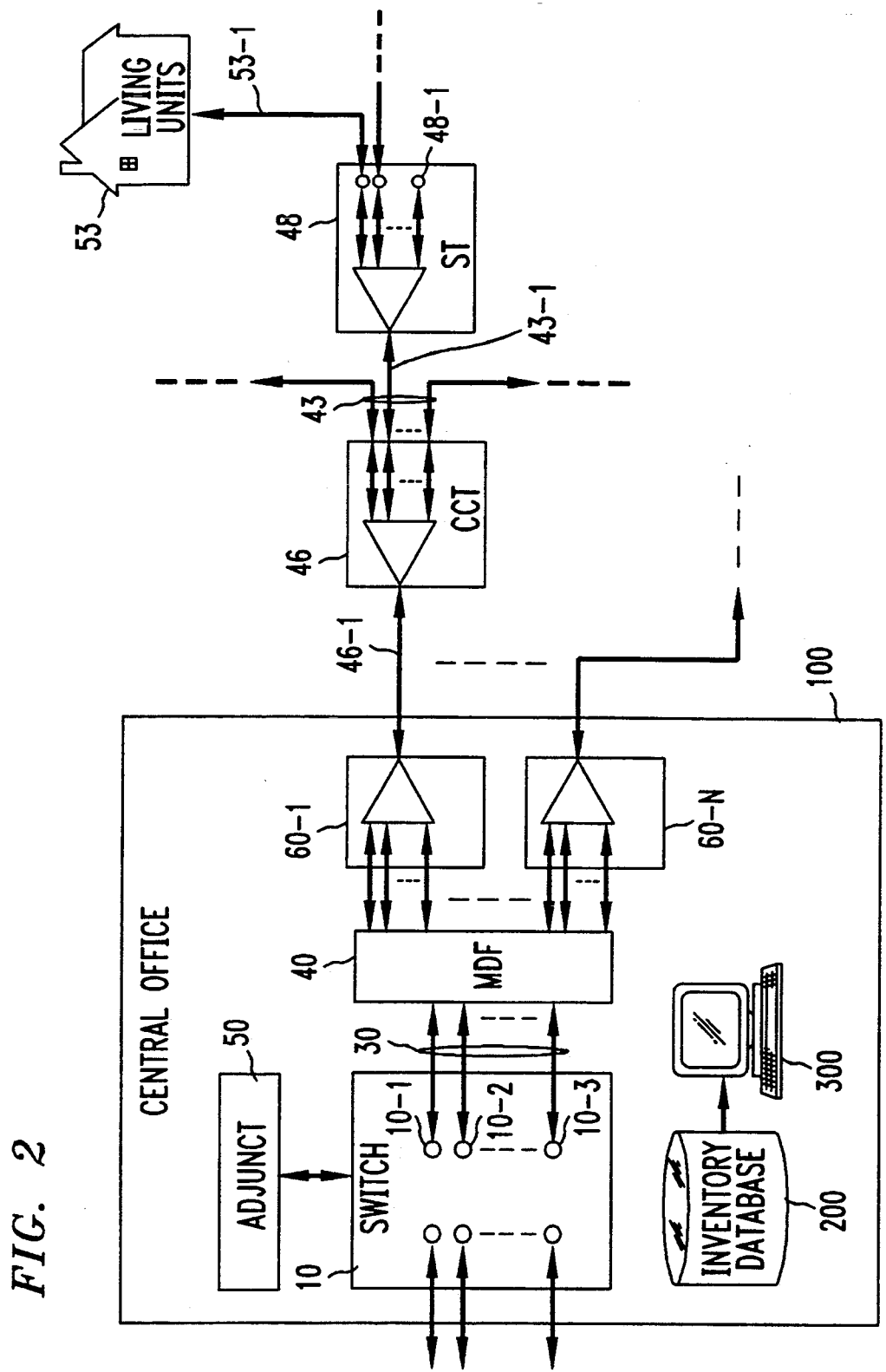
FIG. 2 is a broad block diagram of a central office and its associated outside plant facilitates in which the principle of the invention may be practiced.

A telephone central office, e.g., CO 100 of FIG. 2, is typically formed from a number of switching facilities, one of which is shown in the FIG., namely switch 10, which may be, for example, the No. 5ESS (trademark of AT&T) that is available from AT&T. Associated with switch 10 is conventional Main Distributing Frame (MDF) 40. Terminals at one side of MDF 40 connect to respective port circuits (e.g., 10-1, 10-2, 10-3, etc.) of switch 10 via respective leads of a number of cables collectively designated 30. Terminals at the other side of MDF 40 connect to terminals of respective ones of a plurality of multiplexer circuits 60-1 through 60-N.

Multiplexer circuits 60-1 through 60-N, more particularly, multiplex signals that they receive from switch 10 via MDF 40 onto respective transmission media whose bandwidth is segmented into respective time-based channels. The latter transmission media constitutes the first level of the outside plant facilities associated with CO 100 and extend to cross-connect terminal CCT 46 via transmission media 46-1.

CCT 46, in turn, demultiplexes the channels and distributes the contents thereof to respective ones of its associated port terminals collectively designated as 44. Port terminals 44, more particularly, each represent respective time-based signal distribution apparatus which multiplexes information signals onto respective time-based channels formed on associated transmission media 43, e.g., transmission media 43-1. Each such transmission media extends to a Serving Terminal (ST), e.g., ST 48. Similarly, the serving terminal, e.g., ST 48, demultiplexes the channels presented thereto and distributes the channel information to respective binding posts. The binding posts, in turn, connect via drop wires extending to respective living units and/or business units (not shown). (Information signals traveling in an opposite direction are handled similarly.)

Assume at this point that the person associated with living unit 53 desires telephone service and has communicated with a representative of CO 100 to obtain such service. As a result of that communication, the CO 100 representative enters via computer terminal 300 a service order containing, inter alia, the above person's name, address of living unit 53, billing information and assigned telephone number. Computer terminal 300, in turn, supplies the service order to a number of different service bureaus associated with CO 100 and to inventory database 200 via an associated processor (not shown). The latter processor, in response to receipt of the service order, generates and outputs an installation order describing the outside plant connections that need to be installed in order to provide the requested service to living unit 53.

Since the OE was priorly considered to start at switch 10, an installation order would include installation directions at the various F1 through FN level facilities. However, since the OE may now be considered to start at the associated ST, then only the serving terminal needs to be inventoried in database 200 and listed on the pertinent installation order. Moreover, there is no need to inventory the status of binding posts at a serving terminal, since there is a direct correspondence between those binding posts and ST channels numbers. As such, the inventory information stored in a database 200 record may be reduced significantly.

Advantageously then, a subscriber inventory record and thus an associated installation order need only contain the following information—TN:ST:(address and billing information); where TN is the assigned telephone number and ST is the address of the assigned serving terminal, e.g., ST 48. Accordingly, to provide the aforementioned telephone service, a craftsperson only need connect a drop wire from the subscriber's living unit (or business location) to a particular binding post of the serving terminal identified in the installation order. To identify that binding post the craftsperson may connect a so-called craft access tool to a maintenance channel via an access binding post (terminal) of the identified serving terminal, for example, access terminal 48-1 of ST 48. Briefly, a craft access tool is used to perform a number of telephone maintenance functions including the function performed by a telephone station set. A craftsperson may thus use the tool to place a telephone call to a telephone number that the craftsperson enters via a keypad associated with the tool.

In particular, when the tool is connected to access terminal 48-1 the craftsperson may then cause the tool to generate a conventional off-hook signal. The off-hook signal is recognized by the serving terminal, e.g., ST 48, and passed upstream over an associated maintenance channel to CCT 46 via the upstream pair of two-wire pair cable 43-1. CCT 46, in turn, multiplexes the off-hook signal onto a maintenance channel that is transported to multiplexer 60-1 via the upstream pair of two-wire pair cable 46-1. Multiplexer 60-1 then demultiplexes the contents of the maintenance channel and presents the result via MDF 40 to a switch 10 port associated with the maintenance channel. Switch 10, in response to receipt of the off-hook signal, returns dial tone, which is transported via a downstream path to access terminal 48-1. Upon receipt of the latter signal, the craftsperson may then enter a telephone number associated with adjunct 50, in which the digits forming that number are transported over the aforementioned up-stream path to switch 10. When switch 10 receives the last of such digits it then associates the received telephone number with adjunct 50 and establishes via its internal switching apparatus a connection between the maintenance channel port and adjunct 50.

Figure 3:
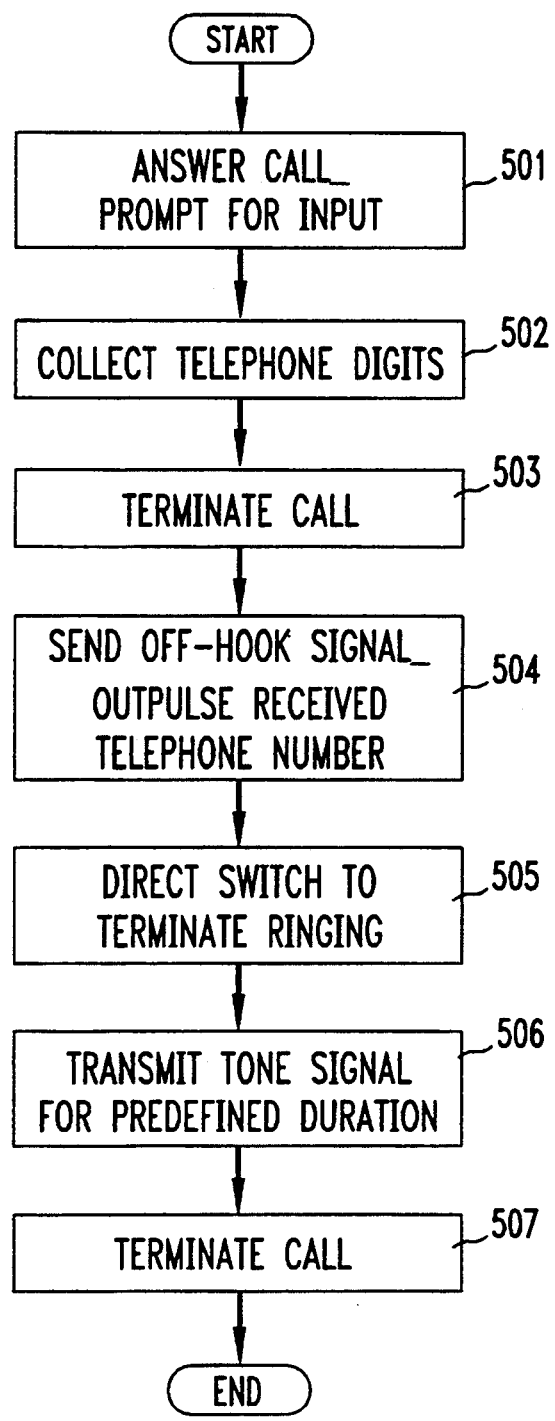
FIG. 3 shows in flow chart form the program which implements the invention in the adjunct computer of FIG. 2.

Adjunct 50, which may be, for example, a conventional personal computer having telephony capabilities, may be readily programmed as shown in FIG. 3 so that in response to receipt of the call, it returns (block 501) over the connection a predefined prompting signal. At that point, the craftsperson "dials" the telephone number assigned to the new service. Upon receipt of the telephone number (block 502), adjunct 50 terminates the connection (block 503) and then, in accord with an aspect of the invention, places a telephone call via switch 10 (block 504) to the telephone number received from the craftsperson. When adjunct 50 receives an audible ringing signal indicating that the telephone connection has been established, it then directs switch 10 (block 505) to terminate the transmission of a ringing signal that switch 10 is transmitting to the called telephone. When switch 10 terminates the transmission of the ringing signal then adjunct 50 transmits (blocks 506 and 507), in accord with an aspect of the invention, a predetermined signal for a predetermined period of time, e.g., a duration of two minutes, which signal is transported downstream via the assigned channel for delivery to the ST 48 binding post that is associated with that channel. At that point, the craftsperson may connect the craft access tool to each unused (idle) binding post of ST 48 and listen for receipt of the adjunct 50 signal to determine which binding post is associated with the assigned channel. When the craftsperson locates that binding post, the craftsperson may then connect the drop wire 53-1 from the pertinent living unit, e.g., LU 53, to the identified binding post, thereby completing the installation of the requested service.

In an alternative embodiment of the invention, adjunct 50 may be arranged so that it generates and transmits a verbal replica of each digit of the telephone number that it receives, as is similarly done in a telephone directory system. Accordingly, the craftsperson may locate the pertinent serving terminal binding post by listening for a verbal transmission of the assigned telephone number.

The foregoing is merely illustrative of the principles of the invention. Those skilled in the art will be able to devise numerous arrangements, which, although not explicitly shown or described herein, nevertheless embody those principles that are within the spirit and scope of the invention. For example, the functions performed by adjunct 50 could be implemented in switch 10, thereby eliminating the need for adjunct 50.

I claim:

1. A method of dynamically determining a serving terminal loop assignment associated with outside telephone plant facilities, said method comprising the steps of at said serving terminal, placing a telephone call via a known access terminal to a predetermined telephone number associated with telephone office adjunct equipment, and at said adjunct (i) answering said telephone call, (ii) prompting for the entry of only a telephone number associated with a telephone station set that is to be connected to said serving terminal, (iii) terminating said call in response to receipt of said entered telephone number, (iv) placing a telephone call to said received telephone number and (v) transmitting a predetermined signal over the associated call connection so that a craftsperson at said serving terminal may identify said loop assignment associated with said entered telephone number by testing each loop assignment associated with said serving terminal for the presence of said predetermined signal, wherein each said loop assignment is a connection from said serving terminal to said telephone office via at least one cross-connect unit and wherein said method further comprises the steps of terminating said loop at a predetermined serving terminal, said loop being one of a plurality of telephone line loops originating at said serving terminal and extending to said telephone office, individual ones of said loops then extending from said serving terminal to telephone facilities associated with respective telephone subscribers, storing in memory data identifying said serving terminal as being the originating point of said loop, and responsive to a request for telephone service from a person having telephone facilities that may be served by said serving terminal, determining from said data that said loop is available for connection to those telephone facilities, assigning said telephone number to said person as a result of said request and associating, in said memory, said telephone number with said loop.

2. A method of processing a request for telephone service, said processing involving assigning an idle telephone loop to provide said telephone service, said method comprising the steps of terminating said idle telephone loop at a predetermined serving terminal, said idle telephone loop being one of a plurality of telephone line loops originating at said serving terminal and extending to a telephone central office, individual ones of said loops then extending from said serving terminal to telephone facilities associated with respective telephone subscribers, storing in memory data identifying said serving terminal as being the originating point of said idle telephone loop, responsive to a request for telephone service from a person having telephone facilities that may be served by said serving terminal, determining from said data that said idle telephone loop is available for connection to those telephone facilities, and associating, in said memory, said idle telephone loop with a telephone number assigned to said person as a result of said request, and transmitting signals over said idle telephone loop so that a craftsman positioned at said serving terminal may identify the originating point of that loop and connect it to a telephone line extending from said serving terminal to said person's telephone facilities, whereby as a result of associating said originating point of said idle telephone loop with said serving terminal, then the identity of intermediate connections forming said idle telephone loop between said serving terminal and said central office may be excluded from said stored data.

* * * * *